(12) United States Patent
Lodeho et al.

(10) Patent No.: US 11,280,442 B2
(45) Date of Patent: Mar. 22, 2022

(54) INSULATION OF PIPE-IN-PIPE SYSTEMS

(71) Applicant: Acergy France SAS, Suresnes (FR)

(72) Inventors: Olivier Lodeho, Paris (FR); Alexis Wegner, Paris (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 16/956,530

(22) PCT Filed: Dec. 17, 2018

(86) PCT No.: PCT/IB2018/001562
§ 371 (c)(1),
(2) Date: Jun. 19, 2020

(87) PCT Pub. No.: WO2019/123008
PCT Pub. Date: Jun. 27, 2019

(65) Prior Publication Data
US 2020/0400266 A1    Dec. 24, 2020

(30) Foreign Application Priority Data

Dec. 20, 2017    (GB) ...................................... 1721455

(51) Int. Cl.
| | |
|---|---|
| *F16L 59/07* | (2006.01) |
| *E21B 17/01* | (2006.01) |
| *E21B 36/00* | (2006.01) |
| *F16L 9/18* | (2006.01) |
| *E21B 33/13* | (2006.01) |
| *E21B 43/01* | (2006.01) |

(52) U.S. Cl.
CPC .............. *F16L 59/07* (2013.01); *E21B 17/01* (2013.01); *E21B 33/13* (2013.01); *E21B 36/003* (2013.01); *E21B 43/01* (2013.01); *F16L 9/18* (2013.01)

(58) Field of Classification Search
CPC .......... E21B 36/00; E21B 43/01; E21B 17/01; E21B 33/13; E21B 36/003; F16L 59/07; F16L 9/18; F16L 58/04; F16L 1/161; F16L 39/005; F16L 59/143; F16L 59/04; F16L 59/06; F16L 59/075
See application file for complete search history.

(56) References Cited

U.S. PATENT DOCUMENTS

| | | |
|---|---|---|
| 4,107,946 A | 8/1978 | Potter |
| 4,636,416 A | 1/1987 | Kratel et al. |
| 6,145,547 A | 11/2000 | Villatte |
| 6,955,221 B2 | 10/2005 | Bursaux |
| 7,441,602 B2 | 10/2008 | Saint-Marcoux |
| 2006/0272727 A1 | 12/2006 | Dinon et al. |
| 2009/0301596 A1 | 12/2009 | van Oosten |
| 2011/0197987 A1 | 8/2011 | Koravos et al. |
| 2015/0159775 A1 | 6/2015 | Bonigen et al. |

FOREIGN PATENT DOCUMENTS

| | | |
|---|---|---|
| CN | 2851802 | 12/2006 |
| CN | 204476300 | 7/2015 |
| FR | 2 746 891 | 10/1997 |

(Continued)

*Primary Examiner* — Taras P Bemko
(74) *Attorney, Agent, or Firm* — Levy & Grandinetti

(57) ABSTRACT

A pipe-in-pipe section comprises an inner pipe spaced within an outer pipe to define an annulus between the inner and outer pipes. The annulus contains a solid insulating material, which may be a microporous aerogel, and an inert gas such as krypton at near-atmospheric pressure.

13 Claims, 1 Drawing Sheet

(56) References Cited

FOREIGN PATENT DOCUMENTS

| | | |
|---|---|---|
| FR | 3014528 | 6/2015 |
| GB | 2 351 301 | 12/2000 |
| JP | H01-216191 | 8/1989 |
| WO | WO 95/00797 | 1/1995 |
| WO | WO 02/16732 | 2/2002 |
| WO | WO 2016/093716 | 6/2016 |

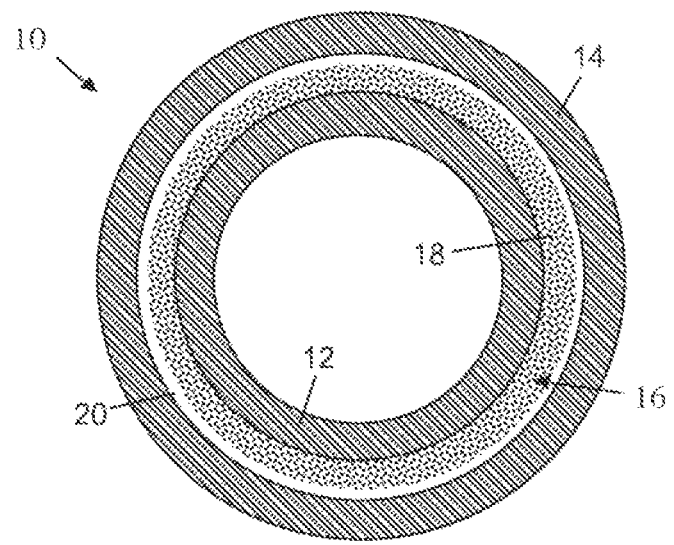

INSULATION OF PIPE-IN-PIPE SYSTEMS

This invention relates to rigid pipelines of pipe-in-pipe ('PiP') construction. Such pipelines may have particular benefits when used in subsea oil and gas installations.

Subsea pipelines are used in oil and gas production as 'tie-backs' to transport crude oil and/or natural gas from a subsea wellhead across the seabed on the way to the surface. Typically, in offshore locations, the oil and gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters the pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high, typically above 65° C. and in some cases above 200° C., despite thermal exchange with seawater which, for example, is at 4° C. below 1000 m depth.

Low temperature increases the viscosity of the production fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. During shut-down, production is stopped and so no hot fluid flows through the pipeline. Consequently, to avoid clogging by solid-phase materials, mitigating fluid such as methanol or diesel oil is injected into the pipeline during shut-down. When production restarts, temperature within the pipeline must be increased quickly so that no plugs will form.

The challenges of thermal management increase as subsea pipelines become longer. In this respect, longer tie-backs tend to be required to exploit oil and gas reserves in remote locations.

Designers of subsea pipelines have adopted both active and passive approaches to thermal management, either individually or in combination.

In some active thermal management systems, a trace heating system employs resistive electrical wires running along, and in thermal contact with, the outer surface of a steel pipeline. Heat produced by passing an electric current along the wires is conducted through the pipe wall to the production fluid flowing within. An example of an electrically trace-heated flowline is disclosed in WO 02/16732. Another approach is to use a heat-exchange system such as that disclosed in U.S. Pat. No. 6,955,221. In that example, circulation of heating fluid requires a return pipeline for closing the heat exchange loop Active heating is expensive and difficult to optimise, be it an electrical or heat-exchanger system. Consequently, passive thermal management is preferred for most applications.

In passive thermal management systems, the pipeline is thermally insulated. For example, the pipeline may be coated with a solid thermally-insulating and protective coating. Polypropylene (PP) is most commonly used to coat the pipe lengths from which pipelines are made. For example, a five-layer PP (5LPP) or seven-layer PP (7LPP) coating may be used for thermal insulation.

Another passive approach to thermal management is to use a PiP structure comprising a fluid-carrying inner pipe or transport pipe positioned concentrically within an outer pipe. The inner and outer pipes may both be of steel or composite material, or one pipe may be of steel and the other pipe may be of composites. The pipes are spaced from each other to define an insulating annulus between them.

In addition to thermal insulation, the double-walled construction enhances mechanical strength and leak protection. An annulus may also be used to transport circulating fluids. For example, the abovementioned U.S. Pat. No. 6,955,221 uses the annulus to carry a flow of heating fluid but it is also possible for the annulus to carry a flow of functional fluid. In this respect, GB 2351301 teaches that lift gas for a gas lift system may be conveyed along the annulus, whereas U.S. Pat. No. 3,674,086 employs circulation of gas in the annulus to ensure dynamic thermal insulation.

In the most basic PiP systems, air trapped inside the annulus by longitudinally-spaced bulkheads provides thermal insulation. The air in the annulus may be at atmospheric pressure. The bulkheads may have ports for pressure equalisation between successive pipe sections. Optionally, additional insulating material may be disposed in the otherwise air-filled annulus. US 2005/212285 discloses such a PiP arrangement.

It is also common to draw down a partial vacuum in the annulus to reduce transmission of heat to the outer pipe through the annulus. For example, FR 2746891 and FR 3014528, and their counterparts U.S. Pat. No. 6,145,547 and US 2015/159775, disclose that pressure inside the annulus may be lowered through a plug or through a bulkhead until a sufficient level of vacuum is reached, typically below 100 mbars. This can improve thermal insulation markedly by exploiting a beneficial interaction between the vacuum and certain microporous insulation materials, for example materials commercialised under the registered trade mark IZOFLEX.

A drawback of PiP solutions that rely upon a vacuum is the time required to achieve a sufficient level of vacuum in industrial conditions, for example when the pipe is exposed to the sun in a coastal yard in a hot climate. Another difficulty is maintaining the vacuum throughout the operational life of the pipeline, which may be twenty years or more.

U.S. Pat. No. 7,441,602 proposes another PiP solution that uses changes in thermal conductivity of gas in the annulus, especially air, to control the thermal insulation. The pressure of the gas inside the annulus is varied in accordance with the required thermal insulation. This involves a permanent or temporary connection to a subsea valve and so requires either a permanent umbilical between the surface and a subsea pipeline or the intervention of a diver or a remotely-operated vehicle (ROV), which is costly.

The invention proposes a less expensive alternative to improve the passive thermal insulation of PiP pipelines. The invention does so by exploiting high density of some inert gases, particularly noble or rare gases such as krypton.

CN 204476300 teaches using argon at high pressure in the annulus of a double-wall pipe structure, preferably at a gauge pressure of between 0.5 and 5 MPa, i.e. between 5 and 50 bars. The argon is at such high pressure primarily to counter hydrogen permeation into the annulus, which, if left unchecked, can detrimentally increase the thermal conductivity of the gas in the annulus. The pressure of the argon is also necessary to ensure a sufficiently high level of thermal insulation in the gas-filled annulus. The time taken to achieve elevated pressure is disadvantageous, as is the increased risk of leakage due to the difference from atmospheric pressure.

Another approach is to fill the annulus entirely with solid insulation. For example, US 2006/0272727 discloses such an arrangement, in which one or more containers comprising compressible insulating material within a flexible casing are placed in an annulus of a PiP structure. The container is initially undersized for the annulus, with the insulating material being held in compression by the casing. The casing is then ruptured or otherwise opened to allow the insulating material to expand to fill the annulus.

Against this background, the invention resides in a pipe-in-pipe section comprising an inner pipe spaced within an outer pipe to define an annulus between the inner and outer pipes, wherein the annulus contains a noble gas and a solid insulating material that is spaced from the outer pipe by an annular gap. The noble gas is at least a majority, by concentration, of all gases in the annulus.

The insulating material is a microporous material, preferably a microporous material with an average pore diameter of less than 100 nm. The insulating material may, for example, be silica-based or an aerogel.

The insulating material is suitably arranged as an annular layer in continuous contact with the inner pipe.

Advantageously, the noble gas may be krypton.

The noble gas in the annulus may be at an absolute pressure of greater than 0.5 bars and/or of less than 1.5 bars. Preferably, the noble gas is substantially at atmospheric pressure.

The inventive concept embraces a pipeline comprising a series of pipe-in-pipe sections of the invention, joined end-to-end.

The inventive concept also extends to a corresponding method of insulating an annulus of a pipe-in-pipe section. The method comprises placing a solid insulating material into the annulus so that the insulating material is spaced from the outer pipe by an annular gap, and filling the remainder of the annulus with a noble gas. The insulating material is a microporous material, and the noble gas is at least a majority, by concentration, of all gases in the annulus. The noble gas in the annulus is preferably at an absolute pressure of between 0.5 and 1.5 bars.

The inventive concept also finds expression in a method of filling an initially air-filled annulus of a pipe-in-pipe section with a noble gas such as krypton. That method comprises: pressurising the air-filled annulus to an elevated pressure; flushing the pressurised annulus with the noble gas; and reducing the pressure in the annulus.

After reducing the pressure in the annulus the noble gas may be at an absolute pressure of greater than 0.5 bars, and optionally also less than 1.5 bars. The noble gas in the annulus may be substantially at atmospheric pressure.

Pressure in the air-filled annulus may suitably be increased to above 5 bars before flushing with the noble gas. Then, pressure in the annulus may be reduced to between 0.5 and 1.5 bars after flushing with the noble gas.

The method may comprise flushing the pressurised annulus until the noble gas is at least a majority, by concentration, of all gases in the annulus.

The method may comprise placing a solid insulating material such as a microporous material into the annulus before filling the air-filled remainder of the annulus with the noble gas using the steps set out above, thereby offering an approach for insulating the annulus. The microporous material preferably has an average pore diameter of less than 100 nm.

The insulating material may be silica-based and/or may be an aerogel.

The method may involve placing the insulating material as an annular layer in continuous contact with the inner pipe, and optionally spacing the insulating material from the outer pipe by an annular gap.

In summary, superinsulation materials such as silica aerogels or fumed silica blankets may be used in a PiP annulus due to their extremely low thermal conductivity. The minimal remaining thermal transfer through such superinsulation materials is mostly due to thermal conduction of air. The invention replaces the air in the PiP annulus with an inert, noble or rare gas such as argon or krypton to further reduce the overall thermal conductivity of the superinsulation material. It is beneficial to replace air in the annulus either completely or partially with a rare gas.

The currently preferred inert gas is krypton, which is inexpensive and indeed is available as a by-product of various industrial processes. Krypton is preferred over argon because it is less expensive and is in greater supply. For example, argon is still used for welding whereas the need for krypton in incandescent lamps has been reduced by the rise of LED lamps.

Preferred embodiments of the invention provide a thermally-insulated pipe-in-pipe assembly for transporting a hot fluid through water. The assembly comprises an inner pipe and an outer pipe defining an annulus between its inner wall and an outer wall of the inner pipe. The annulus contains a gas, predominantly a rare or noble gas, and a layer of a solid insulating material. The gas is held steady in the annulus, in the sense of not flowing in bulk along the annulus.

It is preferred that the solid insulating material is porous, especially if pressure within the annulus is relatively low. If porous, the insulating material could fill the radial thickness of the annulus but it preferably leaves a gap within the outer pipe to accommodate a layer of the noble gas, for example surrounding the insulating material.

This gas layer restricts the heat transfer mechanism to thermal convection rather than conduction.

The solid insulating material is preferably a microporous material such as a silica-based material or an aerogel. An advantage of a solid porous insulant is to restrict convection of the gas to the dimensions of the pores. In microporous or nanoporous materials such as aerogels, the pores or cavities are so small as to be only slightly larger than atoms or molecules of gas. Hence, the size of the cavities is comparable to the mean free path, being the average distance traveled by a moving particle between successive collisions.

As a result, very small cavities in a solid insulating material restrict movement of gas particles, decreasing thermal conductivity in addition to eliminating convection, which increases thermal insulation performance. Indeed, by virtue of the Knudsen effect, a solid porous insulant may have thermal conductivity lower than that of the gas it contains.

By replacing air in the annulus, the noble gas prevents unexpected chemical reactions and corrosion of steel caused by residual presence of water molecules. Also, aerogels are hydrophilic and may suffer from a decrease in efficiency of thermal insulation in the presence of water. Another advantage is that if electrical cables are present in the annulus, the noble gas reduces occurrence of the corona effect and partial discharge.

The noble gas is preferably a rare gas such as argon or krypton, or a mixture of such inert gases. The gas may be at around atmospheric pressure or may be slightly below or above atmospheric pressure. The pressure of the gas may, for example, be at an absolute pressure of between 0.5 and 1.5 bars.

A noble gas at atmospheric pressure with solid porous insulation has been found to achieve a level of thermal insulation efficiency that is similar to such gas at a very low pressure of 50 mbars without such insulation, and that is much better than with air.

The annulus is first flushed with argon and/or krypton to make the volume inert. Then, the pressure of the gas within the annulus is adjusted or modified. Lower pressure improves the interaction between the gas and the pores or cavities of a porous insulant. Higher pressure allows the gas insulating property to be adjusted, noting that there is an inflexion point between the overall heat transfer coefficient vs. the pressure of the gas.

It is of course acknowledged that air contains noble or rare gases at trace levels. The invention is instead concerned with substantial concentrations of noble or rare gases, comprising substantially all, or at least a majority, of the gas in the annulus.

In summary, therefore, a pipe-in-pipe section of the invention comprises an inner pipe spaced within an outer pipe to define an annulus between the inner and outer pipes. The annulus contains a solid insulating material, which may be a microporous aerogel, and an inert gas such as krypton at near-atmospheric pressure.

In order that the invention may be more readily understood, reference will now be made, by way of example, to the accompanying drawing, FIG. 1. FIG. 1 is a cross-sectional view of a subsea PiP pipeline in accordance with the invention.

The subsea PiP pipeline 10 shown in FIG. 1 comprises an inner pipe 12 spaced concentrically within an outer pipe 14 to define an annulus 16 between them.

An annular layer of microporous insulation 18, exemplified here by a superinsulation material such as silica aerogel, surrounds the inner pipe 12 as a layer and so is disposed within the annulus 16. Krypton (Kr) constitutes substantially all of the gas in the annulus 16.

The microporous insulation 18 substantially fills the annulus 16, extending from a contact interface with the inner pipe 12 across a majority of the thickness of the annulus 16 to near the outer pipe 14. However, a small annular gap 20 is maintained between the microporous insulation 18 and the outer pipe 14 to minimise the possibility of thermal conduction into the outer pipe 14.

The thermal conductivity of a gas in a porous material can be calculated by the following formula, courtesy of Kaganer, 1969:

$$k_g = \frac{k_{g,0}}{1 + 2\beta K_n}$$

where:
$K_{g,0}$ is the intrinsic conductivity of the gas at standard conditions;
ß is a constant that depends on the gas (its value is 2 for air); and
$K_n$ is the Knudsen number, determined by the following equation:

$$K_n = \frac{l_g}{D}$$

where:
$I_g$ is the mean free course of the gas molecules; and
D is the pore diameter of the porous material When the pores are significantly smaller than $I_g$ (thus, $K_n \gg 1$), gas molecules within a pore collide mainly with the surrounding wall of the pore: this is known as the 'ballistic regime'. Gas conductivity then becomes very low due to the Knudsen effect.

In microporous materials, the pore diameter is reduced below a typical value of $I_g$, being around 100 nm.

The thermal conductivity of the solid microporous material used in the invention is known at a pressure of 1 bar in air. Conductive and radiative heat transfer coefficients of the solid can be measured. $K_g$ may therefore deduced for air.

In addition, $I_g$, as determined by the formula:

$$\ell = \frac{k_B T}{\sqrt{2}\,\pi d^2 p}$$

is very similar for distinct gases. Based on this formula, $I_g$ is similar for krypton, nitrogen and oxygen, namely 360 pm, 364 pm and 346 pm respectively.

$K_g$ can therefore be deduced for krypton.

Consequently, microporous insulation in an atmosphere of krypton at a pressure of around 1 bar has a thermal insulation performance close to that measured for microporous insulation in an atmosphere of air at a deep vacuum pressure of 10 mbars. This has the advantage of achieving excellent thermal insulation performance without the challenges of drawing a deep vacuum and sustaining that pressure differential over many years despite the risk of leakage.

An exemplary method for filling the annulus 16 with krypton is to pressurise the initially air-filled annulus 16 to an elevated pressure of say 10 bars and then to flush the annulus 16 with krypton. When pressure equilibrium is reached, the krypton flushes the air away, especially between the inner pipe 12 and the microporous insulation 18 that surrounds the inner pipe 12.

The invention claimed is:

1. A method of filling an initially air-filled annulus of a pipe-in-pipe section with a noble gas comprises:
   pressurising the air in the air-filled annulus from an initial pressure to an elevated pressure that is above the initial pressure, the elevated pressure being above 5 bars;
   flushing the pressurised annulus with the noble gas; and
   after flushing with the noble gas, reducing the pressure in the annulus to an absolute pressure of less than 1.5 bars.

2. The method of claim 1, wherein the noble gas in the annulus is at an absolute pressure of greater than 0.5 bar.

3. The method of claim 1, wherein the noble gas in the annulus is substantially at atmospheric pressure.

4. The method of claim 1, wherein pressure in the annulus is reduced to between 0.5 and 1.5 bars after flushing with the noble gas.

5. The method of claim 1, wherein the noble gas is krypton.

6. The method of claim 1, comprising flushing the pressurised annulus until the noble gas is at least a majority, by concentration, of all gases in the annulus.

7. The method of claim 1, comprising placing a solid insulating material into the annulus before filling the remainder of the annulus with the noble gas.

8. The method of claim 7, wherein the insulating material is a microporous material.

9. The method of claim 8, wherein the microporous material has an average pore diameter of less than 100 nm.

10. The method of claim 7, wherein the insulating material is silica-based.

11. The method of claim 7, wherein the insulating material is an aerogel.

12. The method of claim 7, comprising placing the insulating material as an annular layer in continuous contact with the inner pipe.

13. The method of claim 7, comprising spacing the insulating material from the outer pipe by an annular gap.

* * * * *